United States Patent
Somaiya et al.

(10) Patent No.: US 11,107,142 B2
(45) Date of Patent: *Aug. 31, 2021

(54) DYNAMICALLY ADJUSTED RESULTS FOR SEARCH INTERFACE

(71) Applicant: eBay Inc., San Jose, CA (US)

(72) Inventors: Manas Haribhai Somaiya, Sunnyvale, CA (US); Nirveek De, Mountain View, CA (US); Ksheerasagar Balaraju, San Jose, CA (US); Jian Xu, San Jose, CA (US)

(73) Assignee: eBay Inc., San Jose, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 16/231,055

(22) Filed: Dec. 21, 2018

(65) Prior Publication Data

US 2019/0188768 A1 Jun. 20, 2019

Related U.S. Application Data

(63) Continuation of application No. 14/721,605, filed on May 26, 2015, now Pat. No. 10,169,799.

(Continued)

(51) Int. Cl.
*G06Q 30/06* (2012.01)
*G06Q 30/08* (2012.01)
(Continued)

(52) U.S. Cl.
CPC ..... *G06Q 30/0627* (2013.01); *G06F 16/2455* (2019.01); *G06F 16/338* (2019.01); *G06Q 30/0629* (2013.01); *G06Q 30/08* (2013.01)

(58) Field of Classification Search
CPC ..... G06Q 30/0601–0643; G06Q 30/08; G06Q 30/06; G06F 16/20; G06F 16/24–2428;
(Continued)

(56) References Cited

U.S. PATENT DOCUMENTS

| 7,497,369 B2 | 3/2009 | Dalzell et al. |
| 8,401,924 B1 | 3/2013 | Rajyaguru et al. |

(Continued)

FOREIGN PATENT DOCUMENTS

| WO | 2016/025628 A2 | 2/2016 |
| WO | 2016/025628 A3 | 5/2016 |

OTHER PUBLICATIONS

Applicant Initiated Interview Summary received for U.S. Appl. No. 14/721,605, dated Dec. 4, 2018, 3 pages.
(Continued)

*Primary Examiner* — William J Allen
(74) *Attorney, Agent, or Firm* — Shook, Hardy & Bacon L.L.P

(57) ABSTRACT

Several systems, apparatuses, and methods are described. A data transmission that includes data indicating a first search query for an item of a publication system is received from a client machine. A first plurality of search results is determined from listed items based, at least in part, on the first search query, and the first plurality of search results are each associated with a price. A range of prices associated with a first subset of the search results is determined based on a price distribution range including a median price associated with the first search results, or a utility cost function using a plurality of price quantiles and a plurality of price values included in different price quantiles. The determined first search results and the range of prices associated with the first subset of the first search results are transmitted to the client machine for display.

20 Claims, 14 Drawing Sheets

Related U.S. Application Data

(60) Provisional application No. 62/036,955, filed on Aug. 13, 2014.

(51) Int. Cl.
*G06F 16/338* (2019.01)
*G06F 16/2455* (2019.01)

(58) Field of Classification Search
CPC .... G06F 16/245; G06F 16/2455; G06F 16/30; G06F 16/33–38; G06F 16/338; G06F 16/43
See application file for complete search history.

(56) References Cited

U.S. PATENT DOCUMENTS

| | | |
|---|---|---|
| 8,428,996 B2 | 4/2013 | Grove et al. |
| 9,489,400 B1 | 11/2016 | Haitani |
| 10,169,799 B2 | 1/2019 | Somaiya et al. |
| 2002/0023076 A1 | 2/2002 | Shishido |
| 2003/0171999 A1 | 9/2003 | Shishido |
| 2005/0091140 A1 | 4/2005 | Sloan et al. |
| 2006/0064411 A1 | 3/2006 | Gross et al. |
| 2006/0095345 A1 | 5/2006 | Ka et al. |
| 2008/0005118 A1 | 1/2008 | Shakib et al. |
| 2008/0086451 A1 | 4/2008 | Torres et al. |
| 2008/0243644 A1 | 10/2008 | Bezos et al. |
| 2009/0043759 A1 | 2/2009 | Danish et al. |
| 2009/0287657 A1 | 11/2009 | Bennett |
| 2011/0184806 A1 | 7/2011 | Chen et al. |
| 2011/0231291 A1 | 9/2011 | Yankovich et al. |
| 2012/0102573 A1 | 4/2012 | Spooner et al. |
| 2013/0103484 A1 | 4/2013 | Mclaughlin |
| 2013/0104063 A1 | 4/2013 | Legris |
| 2013/0151511 A1 | 6/2013 | Yamahara |
| 2013/0268515 A1 | 10/2013 | Maslovskis |
| 2015/0254762 A1 | 9/2015 | Fisher |
| 2015/0310466 A1 | 10/2015 | Lacivita et al. |
| 2016/0048897 A1 | 2/2016 | Somaiya et al. |
| 2017/0109833 A1 | 4/2017 | Taira et al. |

OTHER PUBLICATIONS

Applicant Initiated Interview Summary received for U.S. Appl. No. 14/721,605, dated Dec. 14, 2017, 3 pages.
Applicant Initiated Interview Summary received for U.S. Appl. No. 14/721,605, dated Jun. 12, 2018, 3 pages.
Final Office Action received for U.S. Appl. No. 14/721,605, dated Oct. 31, 2017, 32 pages.
First Action Interview—Office Action received for U.S. Appl. No. 14/721,605, dated Aug. 1, 2017, 38 pages.
Non-Final Office Action received for U.S. Appl. No. 14/721,605, dated Mar. 27, 2018, 21 pages.
Notice of Allowance received for U.S. Appl. No. 14/721,605, dated Aug. 15, 2018, 11 pages.
Preinterview First Office Action received for U.S. Appl. No. 14/721,605, dated Jun. 6, 2017, 32 pages.
Response to Final Office Action filed on Jan. 3, 2018 for U.S. Appl. No. 14/721,605, dated Oct. 31, 2017, 21 pages.
Response to Non-Final Office Action filed on Jun. 21, 2018 for U.S. Appl. No. 14/721,605, dated Mar. 27, 2018, 13 pages.
Response to Preinterview First Office Action filed on Aug. 4, 2017 for U.S. Appl. No. 14/721,605, dated Jun. 6, 2017, 18 pages.
International Preliminary Report on Patentability received for PCT Application No. PCT/US2015/044899, dated Feb. 23, 2017, 10 pages.
International Search Report for PCT Application No. PCT/US2015/044899, dated Mar. 30, 2016, 2 pages.
International Written Opinion for PCT Application No. PCT/US2015/044899, dated Mar. 30, 2016, 8 pages.
Williams, "Google Buys British Comparison Site BeatThatQuote.com", Retrieved from the Internet URL: <https://www.telegraph.co.uk/technology/google/8368192/GooglebuysBritishcomparisonsiteBeatThatQuote.com.html>, Mar. 8, 2011, 2 pages.

120 and 122

| Publication Application 200 | Auction Application(s) 202 | Fixed-Price Application(s) 204 |
|---|---|---|
| Store Application(s) 206 | Reputation Application(s) 208 | Personalization Application(s) 210 |
| Internationalization Application(s) 212 | Navigation Application(s) 214 | Imaging Application(s) 216 |
| Listing Creation (Seller) Application(s) 218 | Listing Management (Seller) Application(s) 220 | Post-Listing Management Application(s) 222 |
| Dispute Resolution Application(s) 224 | Fraud Prevention Application(s) 226 | Messaging Application(s) 228 |
| Merchandising Application(s) 230 | Loyalty Promotion Application(s) 232 | |

FIG. 2

DYNAMICALLY ADJUSTED RESULTS FOR SEARCH INTERFACE

PRIORITY CLAIM

This application claims the benefit of U.S. application Ser. No. 14/721,605, filed May 26, 2015, which itself claims the benefit of U.S. Provisional Application No. 62/036,955, filed Aug. 13, 2014. The contents of both of which are hereby incorporated by reference in their entirety.

TECHNICAL FIELD

The present application relates generally to the technical field of data processing and, in particular, to dynamically adjusting results for one or more queries received via a search interface.

BACKGROUND

A publication system may provide a user interface for a user to access a wide variety of items or services for sale. The publication system may be accessed using a web browser, such as Google Chrome, Mozilla Firefox, Microsoft Internet Explorer, and other such web browsers. The publication system may accept search queries via the web browser to help a user find a particular offered item, such as a good or service. In response, the publication system may display a set of search results that match, or are related to, the received search query. However, the user may not know what a searched item's typical or popular price listing or sale price is, and the publication system may have no meaningful way for the user to quickly determine this information.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIG. 2 illustrates exemplary applications executable by one or more application servers, according to aspects of the disclosure.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

The present disclosure is, in example embodiments, directed to systems and methods for displaying popular price ranges in a search experience. One of the challenges in offering items for sale through a publication system such as an electronic marketplace is that users may not have had any specific price points or ranges in mind when searching for a good and/or service. When a user is presented with a large assortment of offered goods and/or services, the user may have to use a considerable amount of time and energy to find typical or popular price ranges for any given good or service. Furthermore, with the large assortment of goods or services that may be available through the electronic marketplace, it may be technically difficult for a user to determine typical or popular price ranges for any given good or service. Thus, the present disclosure provides a system and methodology for dynamically determining popular price ranges for one or more items based on one or more received search queries.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to execute the instructions.

Figure 1:
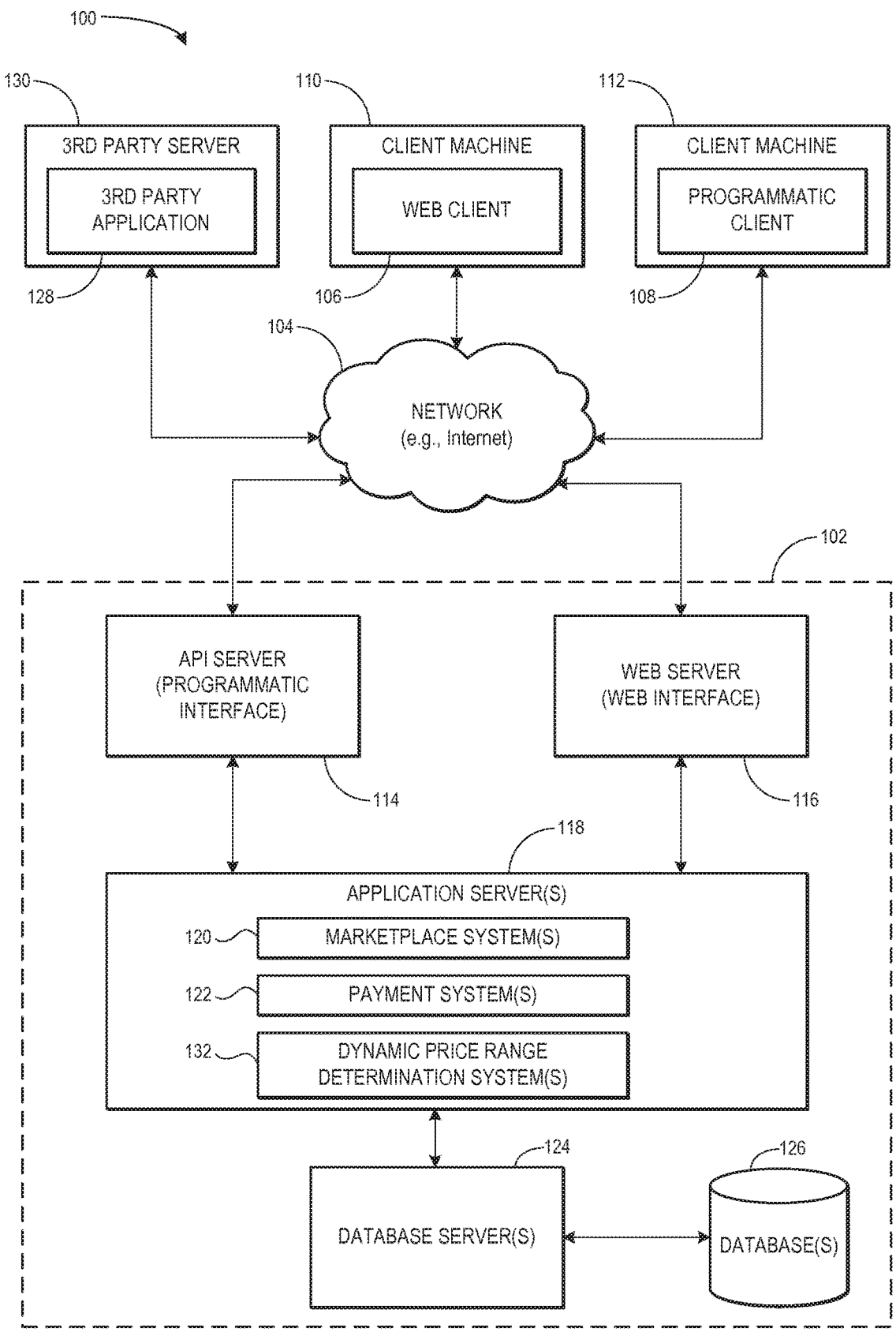
FIG. 1 illustrates a network architecture of an exemplary system, according to aspects of the disclosure.

FIG. 1 is a network diagram depicting a client-server system 100 according to aspects of the disclosure. A networked system 102, in the example forms of a network-based marketplace or publication system, provides server-side functionality, via a network 104 (e.g., the Internet or a Wide Area Network (WAN)) to one or more client machines. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An Application Program Interface (API) server 114 and a web server 116 are coupled to, and provide programmatic and web interfaces respectively to, one or more application servers 118. The application server(s) 118 host one or more applications, such as a marketplace system(s) 120, a payment system(s) 122, and one or more dynamic price range determination systems 132. The application server(s) 118 are, in turn, shown to be coupled to one or more database servers 124 that facilitate access to one or more databases 126.

The marketplace system(s) 120 may provide a number of marketplace functions and services to users who access the networked system 102. The payment system(s) 122 may likewise provide a number of payment services and functions to users. The payment system(s) 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace system(s) 120.

The application server(s) 118 may also include one or more dynamic price range determination system(s) 132 to dynamically determine popular price ranges for one or more items based on one or more received search queries. In one embodiment, the dynamic price range determination system(s) 132 may determine one or more popular price ranges for items related to a given search query. In an alternative embodiment, the dynamic price range system(s) 132 and the marketplace system(s) 120 can be included in the same system.

As discussed further below, the price ranges and price points may be collected from one or more sources, such as items being offered for sale through the electronic marketplace, items being offered at auctions hosted by the electronic marketplace, items having been previously sold through the electronic marketplace, external sources (e.g., application-programming interfaces to other electronic marketplaces), and other such sources. Thus, when a search query is received for items being offered for sale through the electronic marketplace, the application server(s) 118 provide one or more price ranges for the prices of search results that correspond to the received search query. Furthermore, the dynamic price range determination system(s) 132 may continuously or intermittently determine the popular price ranges or price points using recently collected data, which provides a measure of confidence to the user that he or she is receiving the most currently available pricing information.

While the marketplace system(s) 120, the payment system(s) 122, and the dynamic price range determination system(s) 132 are shown in FIG. 1 to form part of the networked system 102, it will be appreciated that, in alternative embodiments, the applications 120, 122, and 132 may be separate or distinct from the system 102. For example, the payment system(s) 122 may form part of a payment service that is separate and distinct from the networked system 102.

Further, while the system 100 shown in FIG. 1 employs a client-server architecture, the embodiments are of course not limited to such an architecture, and could equally well find application in a distributed, or peer-to-peer, architecture system, for example. The marketplace system(s) 120, the payment system(s) 122, and the dynamic price range determination system(s) 132 could also be implemented as stand-alone software programs, which do not necessarily have networking capabilities.

The web client 106 may access the marketplace system(s) 120, the payment system(s) 122, and the dynamic price range determination system(s) 132 via the web interface supported by the web server 116. Similarly, the programmatic client 108 may access the various services and functions provided by the applications 120, 122, and 132 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, payment, or advertising functions that are supported by the relevant applications of the networked system 102.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services.

FIG. 2 illustrates exemplary applications that may be executable by the foregoing application server(s) 118 to support the aforementioned mechanisms. To this end, the marketplace application 120 and the payment application 122 are shown to include at least one publication application 200 and one or more auction applications 202, which support auction-format listing and price setting mechanisms (e.g., English, Dutch, Vickrey, Chinese, Double, Reverse auctions). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing one of the appropriate personalization applications 210, create a personalized reference page on which information regarding transactions to which the user is (or has been) a party may be viewed. Further, one of the personalization applications 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic, or marketplace criteria). For example, the internationalization applications 212 may be used to support the customization of information for a number of regional websites that are operated by the networked system 102 and that are accessible via web server 116.

Navigation of the networked system 102 may be facilitated by one or more navigation applications 214. For example, a search application (as an example for one of the navigation applications 214) may enable key word searches of listings published via the networked system 102. A browse application may allow users to browse various category, catalogue, or inventory data structures according to which listings may be classified within the networked system 102. Various others of the navigation applications 214 may be provided to supplement the search and browsing applications.

In order to make the listings available via the networked system 102 as visually informing and attractive as possible, the applications 120 and 122 may include one or more imaging applications 216, which users may utilize to upload images for inclusion within listings. The imaging applications 216 also operate to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, one or more post-listing management applications 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established or concluded with a particular seller, and may be offered a reward for which accumulated loyalty points can be redeemed.

Furthermore, and referring back to FIG. 1, the dynamic price range determination system(s) 132 may leverage one or more of the applications 200-232 in dynamically determining popular price ranges for one or more items based on one or more received search queries and for providing a meaningful display of this information. In other words, the dynamic price range determination system(s) 132 may invoke or use data gathered by the applications 200-232 in determining popular price ranges and/or points for a given search query, and which listings are ultimately displayed to the user as popular price ranges. For example, the dynamic price range determination system(s) 132 may obtain one or more search queries via the navigation application(s) 214, and prices for the various listings via the auction application(s) 202 and/or the fixed-price application(s) 204. The dynamic price range determination system(s) 132 may also access other applications shown in FIG. 2, such as the store application(s) 206, to obtain prices for items that were previously sold.

As the dynamic price determination system(s) 132 may be integrated (e.g., directly or indirectly) with the application server(s) 118, the dynamic price range determination system(s) 132 may leverage the data obtained from the applications 200-232 and provide relatively up-to-date or current price ranges for items being offered through the electronic marketplace. This integration may further extend to the one or more database server(s) 124 or database(s) 126 in communication with the application server(s) 118. As discussed below, the dynamic price range determination system(s) 132 may access stored information, such as session logs, to dynamically determine popular price ranges for one or more items based on one or more received search queries.

Figure 3:
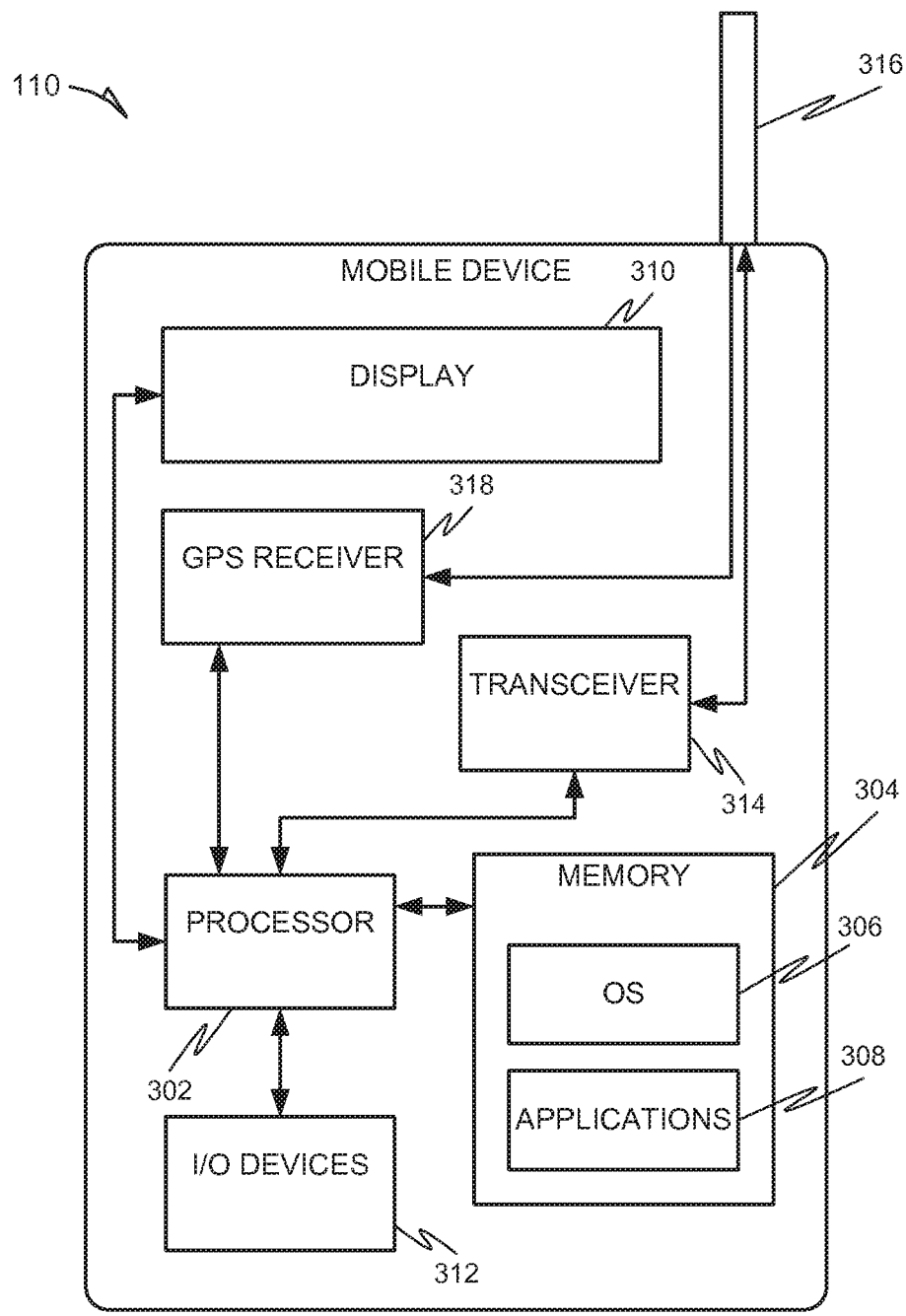
FIG. 3 illustrates an exemplary client machine, according to aspects of the disclosure.

FIG. 3 illustrates one example for one of the client machines 110, in accordance with aspects of the disclosure. In one embodiment, the client machine 110 may be a mobile device. The mobile device may include a processor 302. The processor 302 may be any of a variety of different types of commercially available processors suitable for mobile devices (e.g., an ARM architecture microprocessor, a Microprocessor without Interlocked Pipeline Stages (MIPS) architecture processor, or another type of processor). A memory 304, such as a random access memory (RAM), a Flash memory, or other type of memory, is typically accessible to the processor 302. The memory 304 may be adapted to store an operating system 306, as well as application programs 308, such as a mobile location enabled application that can provide location-based services to a user. The processor 302 may be coupled, either directly or via appropriate intermediary hardware, to a display 310 and to one or more input/output (I/O) devices 312, such as a keypad, a touch panel sensor, a microphone, and the like. In some embodiments, display 310 comprises a touchscreen display capable of functioning as an I/O device. Similarly, in some embodiments, the processor 302 can be coupled to a transceiver 314 that interfaces with an antenna 316. The transceiver 314 may be configured to both transmit and receive cellular network signals, wireless data signals, or other types of signals via the antenna 316, depending on the nature of the client machine 110. Further, in some configurations, a Global Positioning Satellite GPS receiver 318 may also make use of the antenna 316 to receive GPS signals.

The applications 308 of the client machine 110 may further include one or more browser applications, such as mobile browser applications, which may be used to provide a user interface to permit the user to browse information available over the network interface. The applications 308 may further include one or more provider-specific mobile applications (alternatively referred to herein as "mobile apps"), downloaded (e.g., downloaded by the user from a mobile software distribution platform) and resident on the client machine 110, that enable the user to access content through the mobile app in addition to said mobile browser application.

As referred to herein, mobile browsers and mobile apps may describe computer programs designed to run specifically on mobile devices such as smartphones, tablet computers, other handheld computing devices, etc. Mobile browsers and mobile apps may be designed with consideration to the constraints (e.g., low-power processors, limited memory) and features (e.g., location identification capabilities using geo-location sensors, integrated cellular telephone connectivity) of mobile devices. Mobile browsers and mobile apps may also implement mobile user interface (UI) designs that consider constraints of the screen size of the display 310, touchscreen capabilities of the display 310, and the like.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Figure 4:
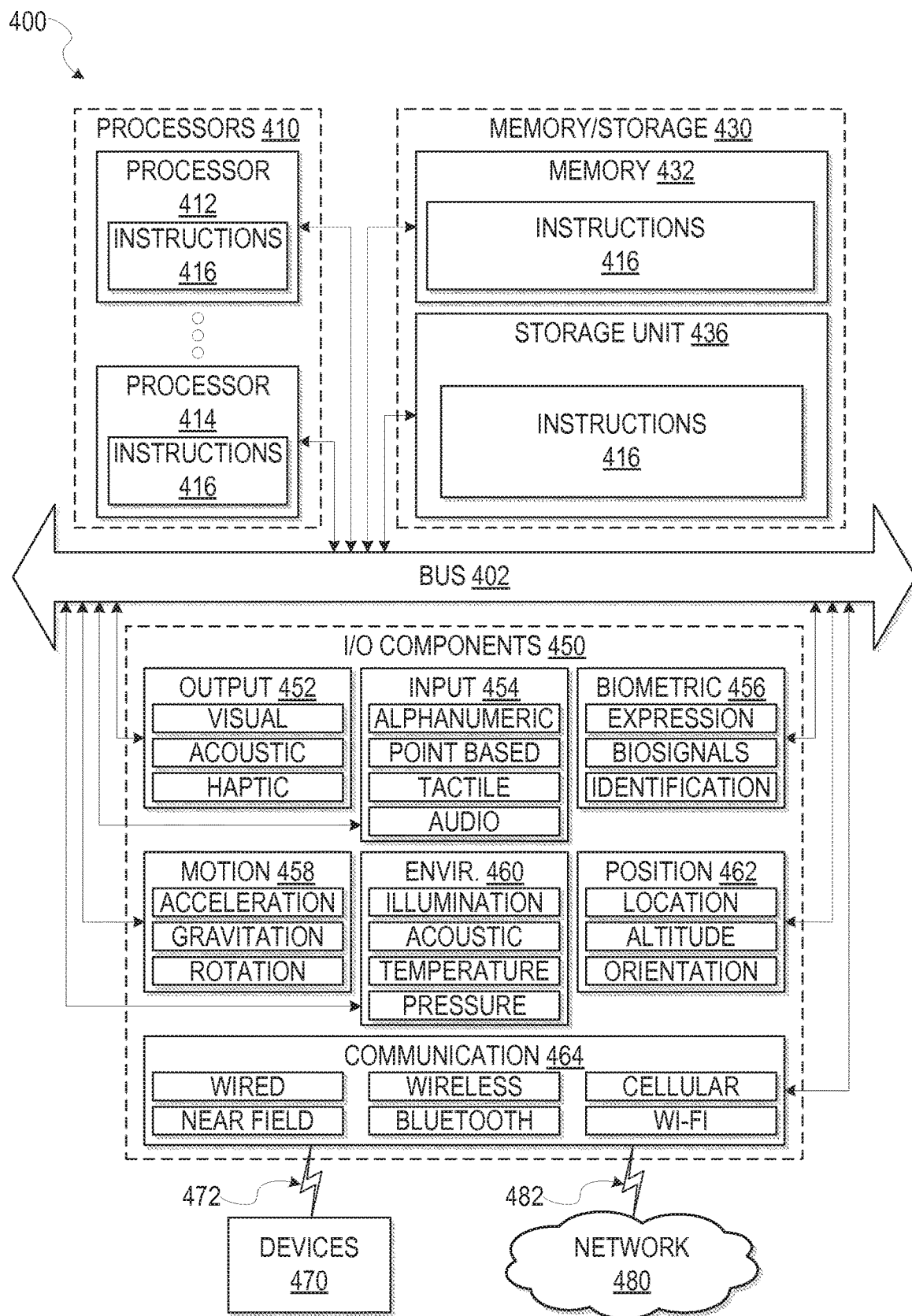
FIG. 4 is a block diagram illustrating components of a machine able to read instructions from a machine-readable medium (e.g., a machine-readable storage medium) and perform any one or more of the methodologies discussed herein, according to aspects of the disclosure.

FIG. 4 is a block diagram illustrating components of a machine 400, according to some example embodiments, able to read instructions from a machine-readable medium (e.g., a machine-readable storage medium) and perform any one or more of the methodologies discussed herein according to aspects of the disclosure. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example the instructions may cause the machine to execute the flow diagrams of FIG. 6 and FIGS. 11A-11C (discussed in further detail below). Additionally, or alternatively, the instructions may implement the dynamic price range determination modules discussed herein, and so forth. The instructions transform the general, non-programmed machine into a particular machine programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 412 and processor 414 that may execute instructions 416. The term "processor" is intended to include a multi-core processor that may comprise two or more independent processors (sometimes referred to as "cores") that may execute instructions contemporaneously. Although FIG. 4 shows multiple processors, the machine 400 may include a single processor with a single core, a single processor with multiple cores (e.g., a multi-core process), multiple processors with a single core, multiple processors with multiples cores, or any combination thereof.

The memory/storage 430 may include a memory 432, such as a main memory, or other memory storage, and a storage unit 436, both accessible to the processors 410 such as via the bus 402. The storage unit 436 and memory 432 store the instructions 416 embodying any one or more of the dynamic price range determination methodologies or functions described herein. The instructions 416 may also reside, completely or partially, within the memory 432, within the storage unit 436, within at least one of the processors 410 (e.g., within the processor's cache memory), or any suitable combination thereof, during execution thereof by the machine 400. Accordingly, the memory 432, the storage unit 436, and the memory of processors 410 are examples of machine-readable media.

As used herein, "machine-readable medium" means a device able to store instructions and data temporarily or permanently and may include, but is not be limited to, RAM, read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 416. The term "machine-readable medium" shall also be taken to include any medium, or combination of multiple media, that is capable of storing instructions (e.g., instructions 416) for execution by a machine (e.g., machine 400), such that the instructions, when executed by one or more processors of the machine 400 (e.g., processors 410), cause the machine 400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion and the grouping is in no way limiting. In various example embodiments, the I/O components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462 among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via coupling 482 and coupling 472, respectively. For example, the communication components 464 may include a network interface component or other suitable device to interface with the network 480. In further examples, communication components 464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., a peripheral device coupled via a Universal Serial Bus (USB)).

Moreover, the communication components 464 may detect identifiers or include components operable to detect identifiers. For example, the communication components 464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as, location via Internet Protocol (IP) geo-location, location via Wi-Fi® signal triangulation, location via detecting a NFC beacon signal that may indicate a particular location, and so forth.

In various example embodiments, one or more portions of the network 480 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network and the coupling 482 may be a Code Division Multiple Access (CDMA) connection, a Global System for Mobile communications (GSM) connection, or other type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., hypertext transfer protocol (HTTP)). Similarly, the instructions 416 may be transmitted or received using a transmission medium via the coupling 472 (e.g., a peer-to-peer coupling) to devices 470. The term "transmission medium" shall be taken to include any intangible medium that is capable of storing, encoding, or carrying instructions 416 for execution by the machine 400, and includes digital or analog communications signals or other intangible medium to facilitate communication of such software.

Figure 5A:
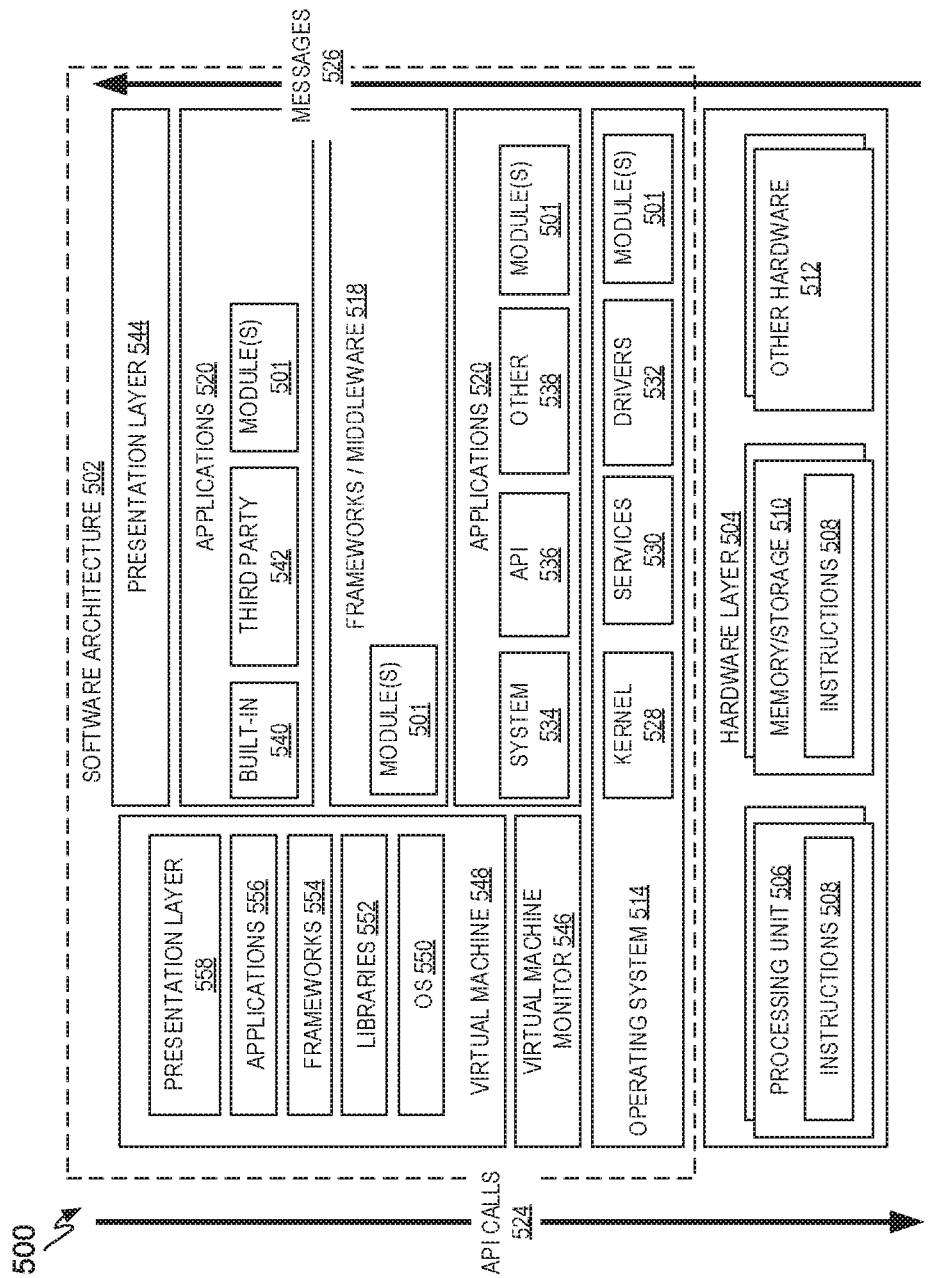
FIGS. 5A-5B are block diagrams illustrating a representative hardware or software architecture, which may be used in conjunction with various hardware architectures herein described, according to aspects of the disclosure.

FIG. 5A is a block diagram 500 illustrating a representative software architecture 502, which may be used in conjunction with various hardware architectures herein described. FIG. 5A is merely a non-limiting example of a software architecture and it will be appreciated that many other architectures may be implemented to facilitate the functionality described herein. The software architecture 502 may be executing on hardware such as machine 400 of FIG. 4 that includes, among other things, processors 410, memory 430, and I/O components 450. A representative hardware layer 504 is illustrated and can represent, for example, the machine 400 of FIG. 4. The representative hardware layer 504 comprises one or more processing units 506 having associated executable instructions 508. Executable instructions 508 represent the executable instructions of the software architecture 502, including implementation of the methods, modules and so forth discussed herein. Hardware layer 504 also includes memory and/or storage modules 510, which also have executable instructions 508. Hardware layer 504 may also comprise other hardware as indicated by 512, which represents any other hardware of the hardware layer 504, such as the other hardware illustrated as part of machine 400.

In the example architecture of FIG. 5, the software architecture 502 may be conceptualized as a stack of layers where each layer provides particular functionality. For example, the software architecture 502 may include layers such as an operating system 514, libraries 516, frameworks/middleware 518, applications 520, and presentation layer 544. Operationally, the applications 520 and/or other components within the layers may invoke API calls 524 through the software stack and receive a response, returned values, and so forth illustrated as messages 526 in response to the API calls 524. The layers illustrated are representative in nature and not all software architectures have all layers. For example, some mobile or special purpose operating systems may not provide a frameworks/middleware layer 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., USB drivers), Wi-Fi® drivers, audio drivers, power management drivers, and so forth depending on the hardware configuration.

The libraries 516 may provide a common infrastructure that may be utilized by the applications 520 and/or other components and/or layers. The libraries 516 typically provide functionality that allows other software modules to perform tasks in an easier fashion than to interface directly with the underlying operating system 514 functionality (e.g., kernel 528, services 530 and/or drivers 532). The libraries 516 may include system 534 libraries (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be utilized by the applications 520 and/or other software components/modules. For example, the frameworks 518 may provide various graphic user interface (GUI) functions, high-level resource management, high-level location services, and so forth. The frameworks 518 may provide a broad spectrum of other APIs that may be utilized by the applications 520 and/or other software components/modules, some of which may be specific to a particular operating system or platform.

The applications 520 include built-in applications 540 and/or third party applications 542. Examples of representative built-in applications 540 may include, but are not limited to, a contacts application, a browser application, a book reader application, a location application, a media application, a messaging application, or a game application. Third party applications 542 may include any of the built in applications as well as a broad assortment of other applications. In a specific example, the third party application 542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 542 may invoke the API calls 524 provided by the mobile operating system such as operating system 514 to facilitate functionality described herein.

The applications 520 may utilize built in operating system functions (e.g., kernel 528, services 530 and/or drivers 532), libraries (e.g., system 534, APIs 536, and other libraries 538), and frameworks/middleware 518 to create user interfaces to interact with users of the system. Alternatively, or additionally, in some systems, interactions with a user may occur through a presentation layer, such as presentation layer 544. In these systems, the application/module "logic" can be separated from the aspects of the application/module that interact with a user.

Some software architectures utilize virtual machines. In the example of FIG. 5, this is illustrated by virtual machine 548. A virtual machine creates a software environment where applications/modules can execute as if they were executing on a hardware machine (e.g., the machine of FIG. 4). A virtual machine is hosted by a host operating system (operating system 514 in FIG. 4) and typically, although not always, has a virtual machine monitor 546, which manages the operation of the virtual machine as well as the interface with the host operating system (e.g., operating system 514). A software architecture executes within the virtual machine such as an operating system 550, libraries 552, frameworks/middleware 554, applications 556, or presentation layer 558. These layers of software architecture executing within the virtual machine 548 can be the same as corresponding layers previously described or may be different.

FIG. 5A illustrates modules 501 that may be included in any combination of the applications 520, the firmware/middleware 518, the libraries 516, and the operating system 514.

Figure 5B:
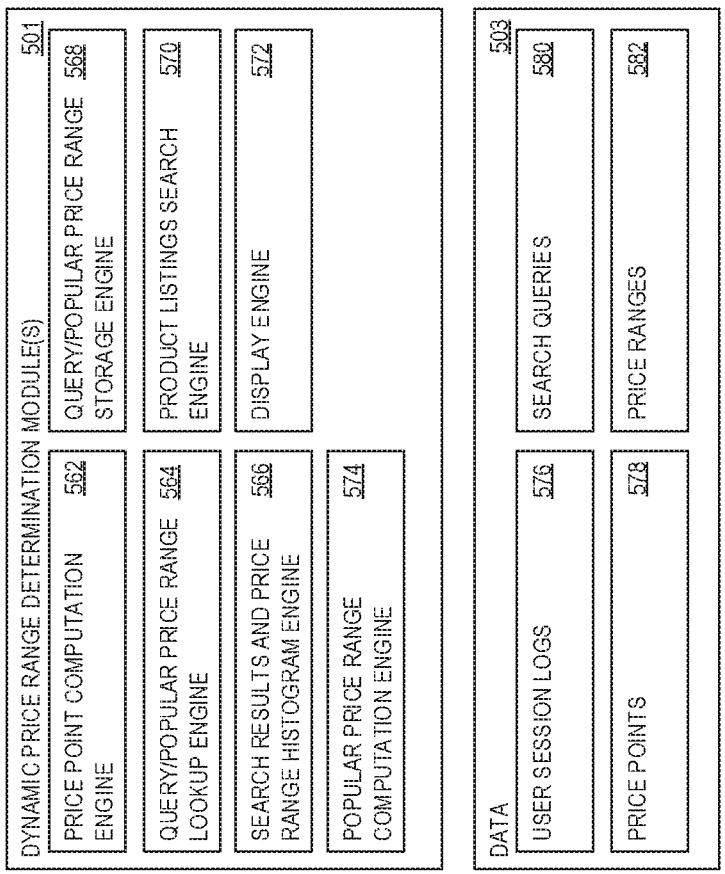

FIG. 5B a block diagram illustrating components of the module(s) 501, according to aspects of the disclosure. The dynamic price range determination module(s) 501 may include one or more components (described in this example as "engines") that select or dynamically determine popular price ranges for one or more items based on one or more received search queries. The dynamic price range determination module(s) 501 may also include one or more engines that determine popular price ranges corresponding to determined price quantiles and the listings that are used to populate the items associated with these price ranges. In one embodiment, the dynamic price range determination module(s) 501 may include a price point computation engine 562, a query/popular price range lookup engine 564, a search results and price range histogram engine 566, a query/popular price range storage engine 568, a product listings search engine 570, a display engine 572, and a popular price range computation engine 574.

Data 503 may be included in the memory/storage 510 and may include various types of information used in determining and associating price quantiles with received search queries. In one embodiment, the data 503 may include user session logs 576, price points 578, user search queries 580, and price ranges 582. Although the dynamic price range determination module(s) 501 and data 503 are shown as including separate engines and information, it should be understood that the dynamic price range determination module(s) 501 and data 503 may include alternative arrangements, such as more or fewer engines or data.

The price point computation engine 562 is configured to determine which price points to use in dynamically determining popular price ranges for one or more items based on one or more received search queries. The sources of the price points may vary and may include prices for listings hosted by the electronic marketplace (e.g., the prices obtainable via the auction application(s) 202 or fixed-price application(s) 204), prices for previously sold items, price for items hosted by other electronic marketplaces, and other such sources.

In one embodiment, the price point computation engine 562 obtains price points from listings currently being offered or final bid prices for auction based item listings (as described in further detail below). As discussed below, the price point computation engine 562 operates in conjunction with the product listings search engine 570 to obtain the listings from which the price points may be extracted. When one or more search results are presented to a user in response to a given search query, the price point computation engine 562 monitors which results the user selects. The prices associated with the one or more search results that the user selects forms the basis for the price points to be used in the determination of the various price quantiles. Alternatively, or in addition, the price point computation engine 562 uses the prices of listings obtained from the search query regardless of whether a given listing is selected by a user. Furthermore, while the price point computation engine 562 may obtain prices in a real-time, or in a near real-time manner (e.g., as search queries are received and as search results are provided), the price point computation engine 562 may reference other sources of information for the price points, such as the user session logs 576 where user session data (e.g. search queries, search results, search result selections) may be temporarily stored.

In addition, the price point computation engine 562 may process prices differently depending on the listing associated with the price such as auction listings, fixed-price listings, new listings, used listings, and other such listings. Where a listing is an auction listing, the price point computation engine 562 may monitor the auction until it completes or closes. When the auction completes or closes, the price point computation engine 562 uses the price of the offered item or service at closing. Where the listing is a fixed-price listing, the price point computation engine 562 uses the price associated with the fixed-price listing as the price point. Furthermore, the price point computation engine 562 may employ a weighting factor to further distinguish price points from one another. For example, a price associated with a new listing may be weighted differently than a price associated with a used listing. Similarly, a price associated with an auction listing may be weighted differently than a price associated with a new listing. Thus, the price point computation engine 562 is configured to distinguish prices for various listings which, in turn, provides for a more accurate and relevant statistical data set for dynamically determining popular price ranges for one or more items based on one or more received search queries.

Furthermore, the price point computation engine 562 may process prices associated with items purchased by a user during the same session in which a search query was received. For example, the price point computation engine 562 processes the price of a digital camera where a user searches for digital cameras in a session of use with the electronic marketplace, and then purchases the digital camera during the same session. As above, the price point computation engine 562 may distinguish between prices that are associated with items that a user selected but did not purchase, items that the user selected but purchased in a later session of use, and items that the user selected and purchased in the same session.

The price point computation engine 562 may also leverage filters or other refinements a user has selected to a refine a set of search results, in processing or determining price points for a given search query. For example, when a set of search results is displayed to the user, the user may also view one or more filters for refining the set of search results. These filters may include physical characteristics of the search results (e.g., size, weight, capabilities), manufacturing characteristics (e.g., model, manufacturer, style), and pricing characteristics. The pricing characteristics may include a manual entry of prices that the user is willing to pay for a given item. The pricing characteristics may include a variety of entry mechanisms including a slider, text entry, or other such mechanisms. When a pricing characteristic value is provided (e.g., when the user provides a price via the pricing characteristic), the price point computation engine 562 may associate the provided price as the price point for the received search query.

While the price point computation engine 562 may leverage the prices associated with listings for items currently offered for sale as the price points in determining the price quantiles, the price point computation engine 562 may also use the prices associated with previously sold items. In one embodiment, the price point computation engine 562 invokes the product listings search engine 570 to obtain prices for items previously sold that match the given search query. The items previously sold may cover a given timespan (e.g., 60 days, 90 days, or other timespan). In an alternative or additional embodiment, the items previously sold may also cover a seasonal pattern. For example, the price of a swim suit may vary (e.g., the price may be slightly higher just before the start of summer than in mid-winter), and the price point computation engine 562 may be configured to capture such seasonal variations. Thus, the price point computation engine 562 may be configured to capture the prices of previously sold items as well as the prices for selected or purchased items in order to provide a more accurate reflection of the price quantiles for a given search query.

Finally, price point computation engine 562 may be configured to obtain prices for items matching the given search query from other electronic marketplaces. In one embodiment, the price point computation engine 562 accesses an API for an outside electronic marketplace, which accepts search queries and provide search results in response. In this embodiment, the price point computation engine 562 provides the given search query to the API for the outside electronic marketplace, and uses the prices of the returned search results (if any) as the price points to associate with the given search query. Thus, the price point computation engine 562 is configured to obtain a breadth of pricing information other than the pricing information available to it via internal mechanisms (e.g., the marketplace system(s) 120, payment system(s) 122).

Having obtained the various prices or price points, the price point computation engine 562 may store such prices or price points as the price points 578. Furthermore, the price point computation engine 562 may store an association of the price points 578 and their respective search queries which, as explained below, may be stored as user search queries 580. Furthermore, the price point computation engine 562 may be configured to update or re-determine the price points for a given search query at one or more predetermined time intervals (e.g., daily, weekly, monthly). In this manner, the price point computation engine 562 ensures that the stored price points 578 are relatively up-to-date or current.

As alluded to above, the product listings search engine 570 is configured to obtain listings that match a given search query. The listings obtained by the product listings search engine 570 may be current listings (e.g., auction listings, fixed price listings), listings that have ended, listings where the item described in the listing was purchased, listings for used items, listings for new items, and other such listings. The product listings search engine 570 communicates with one or more applications, such as the auction application(s) 202, the fixed-price application(s) 204, the store application(s) 206, and other such applications, in obtaining the listings based on the given search query. In addition, the search queries may come from a variety sources, such as from user session logs 576 of prior search queries, current search queries from users currently searching the electronic marketplace, and combinations thereof. In addition, when a search query is received, the product listings search engine 570 may employ one or more natural language processing techniques to determine one or more variants of the received search query. Thus, when a search query is received (e.g., "digital camera"), the search results may encompass search results from variations of the received search query (e.g., "optical camera," "digital SLR camera," "digital photography"). In one embodiment, the product listings search engine 570 is configurable as to the degree of variation in the received search query.

Figure 6:
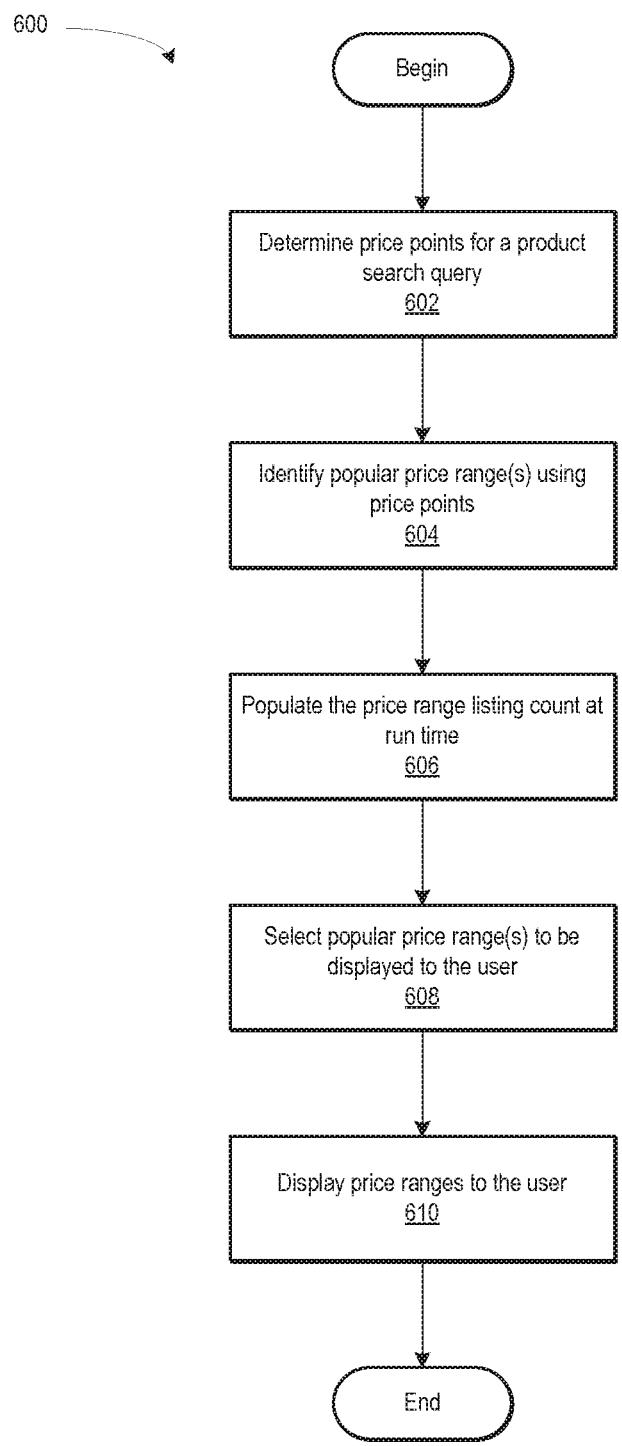
FIG. 6 illustrates an exemplary logic flow for dynamically determining popular price ranges for one or more items based on one or more received search queries according to aspects of the disclosure.

FIG. 6 illustrates an exemplary logic flow for dynamically determining popular price ranges for one or more items based on one or more received search queries according to aspects of the disclosure. Logical flow diagrams as illustrated herein provide examples of sequences of various process actions. Although shown in a particular sequence or order, unless otherwise specified, the order of the actions can be modified. Thus, the described and illustrated implementations should be understood only as examples, the illustrated processes can be performed in a different order, and some actions may be performed in parallel. Additionally, one or more actions can be omitted in various embodiments; thus, not all actions are used in every implementation. Other process flows are possible.

FIG. 6 illustrates a logic flow 600 that includes executing an operation to determine price points for a product search query (block 602). Referring back to FIG. 5B, a storage of user search queries 580 is used for receiving the product search query, and a price point computation engine 562 is used to execute the price points determination operations described below. In an e-commerce marketplace, a search results page usually leads to one or more clicks on the product listings. In this sense, the clicked product listing(s) provides a good proxy for user search queries hat generate a search results page. FIG. 5B illustrates product listings search engine 570 used to execute the product listing search operations described below.

In some embodiments, based on aggregate user behavior of multiple users (e.g., thousands) over a period of time, a well-suited proxy for a search query may be defined as a collection of clicked product listings. These product listings may be new items or used items, and may be listed as auctions or as fixed priced items. As described in further detail below, the product listings may also have other popular attributes like brand, color, size, and the like.

For auction listings, the final closing price of the relevant auction items may be used as the price points for the search query; for fixed price listings, the selling price for the fixed priced items may be used as the price points for the search query. Furthermore, the price points may also be associated not only with the product search query, but also with the combination of the product search query and one or more attributes of the product listings.

In some embodiments, only product listings that were acted upon by users in the same session as when the search query was issued are used. Some examples of user actions may include bidding on the product listing, buying it, adding it to the shopping cart, adding it to a wish list, adding it to a collection of listings, sharing it on popular social networks, and communicating with the seller of the listing. FIG. 5B illustrates storage for these user session logs 576.

In some embodiments, the user interface provides price filters for constraining the search results. These price filters may be displayed, for example, as price ranges, sliders, or free form text boxes in the user interface. In some embodiments, for a given search query, all the applied price filters selected by all the users over a period of time are collected as relevant price points.

Similarly, in other embodiments, the user interface may provide ways to constrain the search results using additional attribute filters such as brand, color, size, and so forth. This data may also be collected and utilized for dynamically determining popular price ranges for one or more items based on one or more received search queries.

Furthermore, some e-commerce marketplaces allow for search through past sold product listings from the last 30 to 90 days. In some embodiments, for a given search query, these entire past sold product listings are returned by the search engine to be used as price points. This may be further extended to a search query in combination with one or more attribute filters.

Furthermore, some e-commerce sites also allow for programmatic search APIs. For any given search query, an external view of the price points may be obtained by searching and logging the returned product listings of other competitors or third party sites. This may be further extended to a search query in a combination with one or more attribute filters.

In some embodiments, the scope of the above exemplary processes may be expanded to include trivial variations of the search query. Trivial variations could include word transpositions, plural singular variations, and common misspellings. Furthermore, in some embodiments, the price points from more than one of these processes may be combined via simple aggregation or via a weighted linear or via a weighted nonlinear aggregation.

An operation to identify one or more popular price ranges for a product search query (block 604 of FIG. 6) is executed. FIG. 5B illustrates a query/popular price range lookup engine 564 to execute the price range query operations described below. In some embodiments, using the price points for a given search query, a price quantile distribution is computed. The number of quantiles may be fixed or may be dynamically determined.

FIG. 5B further illustrates a popular price range computation engine 574. In some embodiments, based on the product or country of the user, a fixed set of price quantiles may be used as popular price range for the product search query. For example, the price range covering a majority (e.g., 50% to 70%) of the price distribution may be marked as popular. These fixed points may be determined by consultation with business units, product management, and outside consulting agencies. They may also be determined with user studies or large scale online A/B testing.

In other embodiments, optimal price ranges for price quantiles are determined. For example, a utility cost function may be defined that computes the utility of picking a particular price range. This may be based on a linear or non-linear function using two price quantiles and two price values at those price quantiles. All possible price ranges may be evaluated for the utility, and the price range with the best utility may be selected as a popular price range. Furthermore, additional business constraints that limit the left edge and the right edge of the price range, and that define the minimum and maximum number of quantiles to cover, may be added to the optimization.

Price range quantiles may be further smoothed out to be multiples of well-known currency multipliers (e.g., 1 or 5 or 10 or 50 or 100). The final smoothed out quantiles may be stored as price ranges for the given search query. FIG. 5B illustrates a query/popular price range storage engine 568 for storing the price ranges. This may be extended to a product search query and combination of one or more product attributes.

An operation to populate the price range listing count at run time (block 606 of FIG. 6) is executed. When a user issues a search query, the previously computed and stored popular price ranges for the query may be retrieved. These price ranges are passed to the search engine along with the search query, and the search engine returns the listings count histogram computed for those price ranges along with the search results. FIG. 5B illustrates search results and price range histogram engine 566 used in executing one or more of the operations described below.

An operation to select one or more popular price ranges to be displayed to the user (block 608 of FIG. 6) is executed. For any given product search query, several popular price ranges may be available for display, as there may be a general popular price range for the query, and then specific popular price ranges that target popular product attributes like condition (new or used), format (fixed price or auction), brand, size, and the like. To avoid cognitive overload for the user, only a limited number of popular price ranges may be shown in some embodiments; this number may be configurable (e.g., several aspects may be considered in making the choice of which price ranges to display).

In some embodiments, for any product search query, popularity of product attributes may be ascertained either via block 602 or other methods. In some of these embodiments, the popular price ranges for the popular product attributes corresponding to this product search may be considered.

In some of these embodiments, additional consideration may be made based on the above described inventory histogram; choices with either zero or low inventory may be dropped from the display. In some of these embodiments, consideration may be given to explicit user applied filters in the search user interface. Both conflicting and obvious choices may be dropped from display, or implicit user applied filters from the product search query may be extracted and applied.

An operation to display price ranges to the user (block 610 of FIG. 6) is executed. FIG. 5B illustrates a display engine 572 used to display these price ranges to the user. Price ranges may be displayed to the user in several ways, including simply displaying clickable price ranges that allow filtering of the search results to that price range, or additionally displaying a page with product listings count for each price range.

Figure 7:
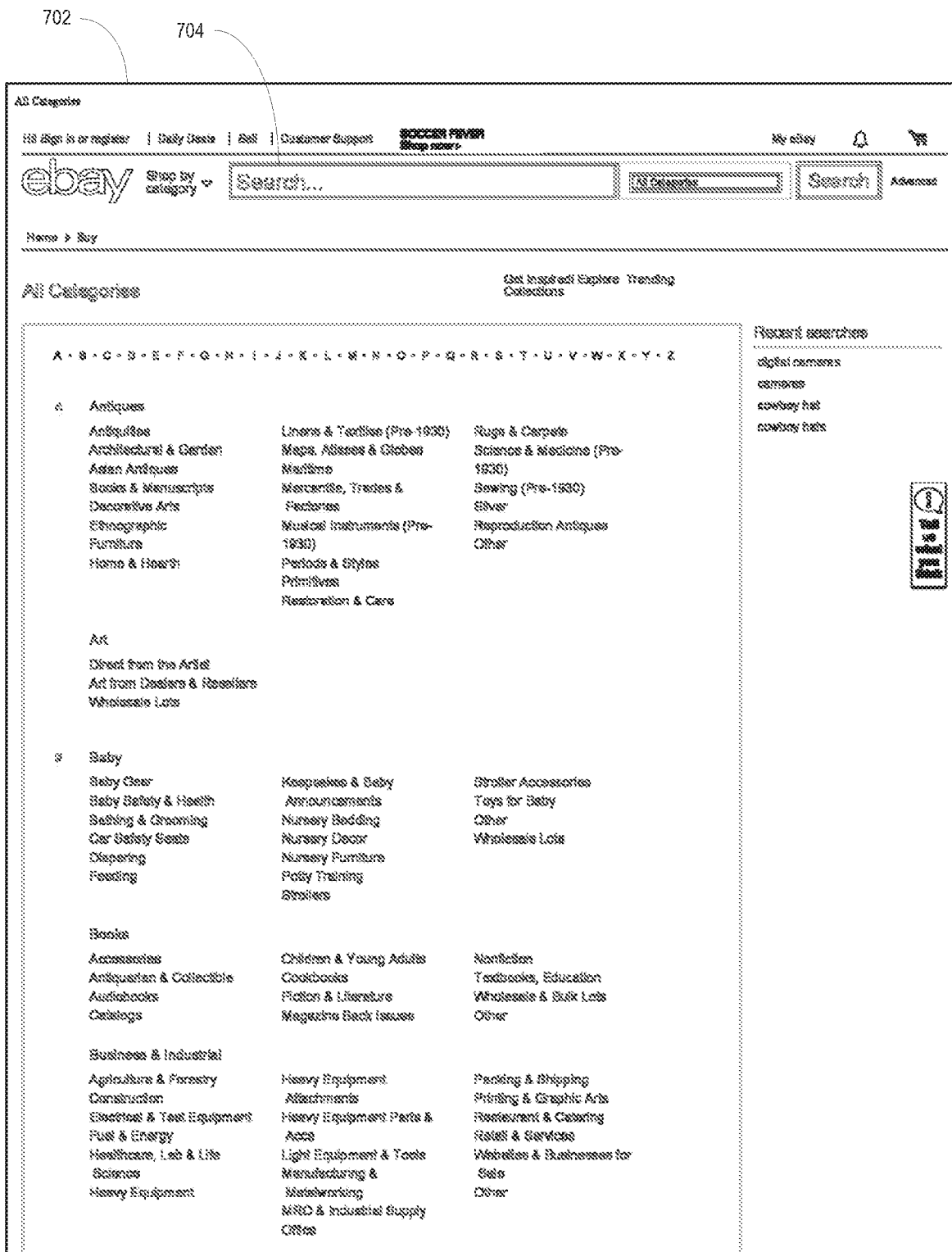
FIG. 7 illustrates a web page of a publication system (e.g., an electronic marketplace) configured to receive search queries for items offered for sale by the electronic marketplace, according to aspects of the disclosure.

FIG. 7 illustrates a web page 702 of a publication system (e.g., an electronic marketplace) configured to receive search queries for items offered for sale by the electronic marketplace, according to aspects of the disclosure. The web page 702 includes an element, such as a text entry box 704, where the user provides a search query to search for listings offered by the electronic marketplace. Web page 702 and subsequent exemplary web pages illustrated and described below may alternatively comprise mobile browser or mobile app implementations in other embodiments.

Figure 8:
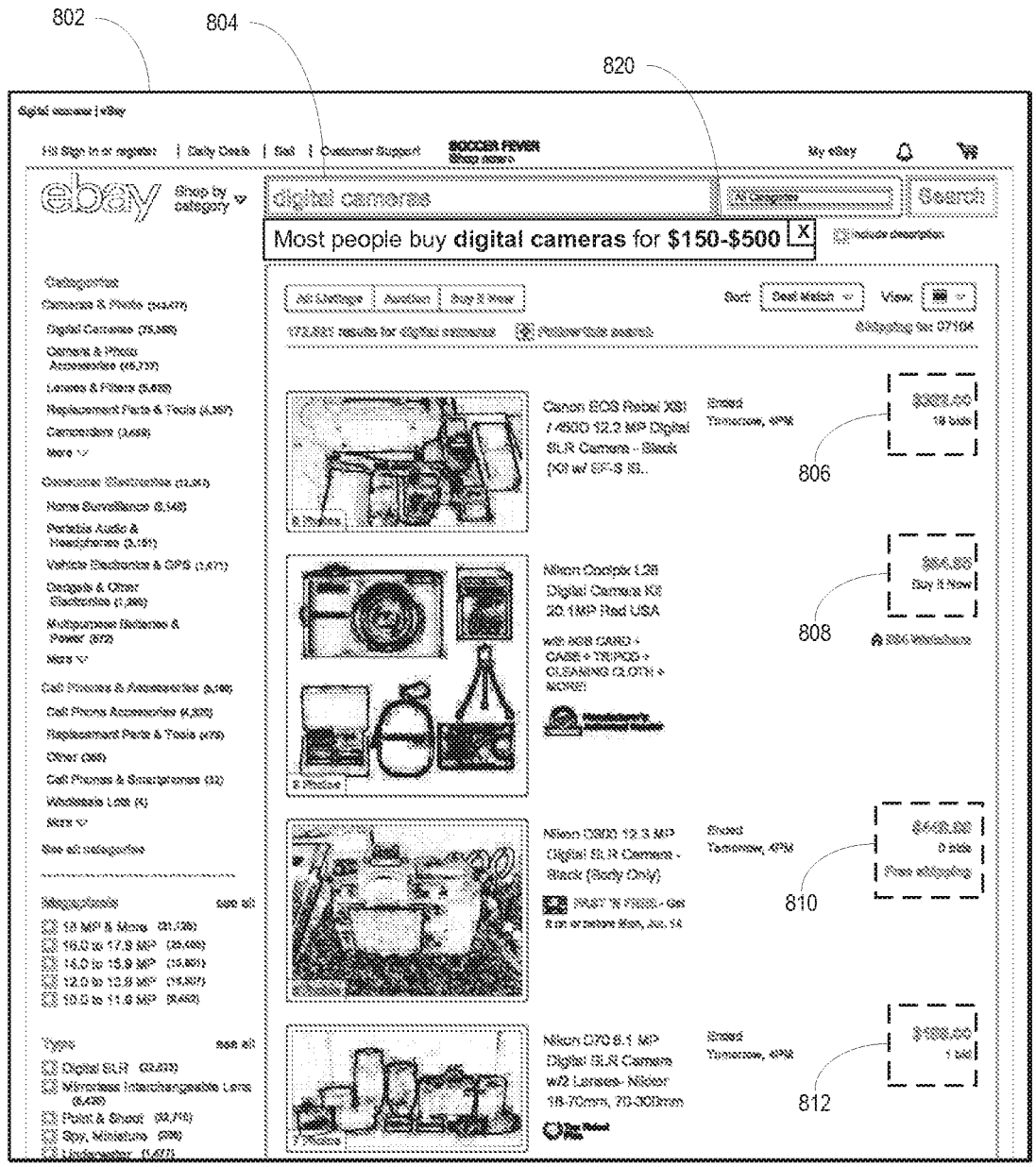
FIG. 8 illustrates another web page of the electronic marketplace displaying search results and a popular price range in response to a received search query, according to aspects of the disclosure.

FIG. 8 illustrates another web page 802 of the electronic marketplace displaying search results in response to a received search query 804, according to aspects of the disclosure. As shown in FIG. 8, the search query 804 includes a search term such as "digital cameras." The displayed search results include listings matching the term "digital cameras," including listings that match variations of that term. In addition, each of the search results are associated with a price, such as prices 806-812.

As discussed above, embodiments may dynamically determine popular price ranges for one or more items based on one or more received search queries. In this embodiment, in response to receiving the search query 804, a range of prices 806-812 associated with a subset of the search results for the search query 804 is determined. In some embodiments, this range of prices includes a median price for the search results. For example, the median price for the search results for the search query 804 may be $250. A "popular price range" may comprise a price range for a majority of the search results for the search query 804 (e.g., a range including the $25^{th}$ percentile price point to the $75^{th}$ percentile price point). In this embodiment, a pop-up window 820 is displayed, with a range of prices associated with the above described price points (e.g., the popular price range displayed comprises $25^{th}$ percentile price point $150 and $75^{th}$ percentile price point $500). In another example, the "popular price range" may be a price range centered on a mean price value of the search results for the search query 804 (e.g., the mean price value+/−a predetermined percentage). Other embodiments may determine and display popular price ranges using other processes (e.g., a utility cost function using a plurality of price quantiles and plurality of price values included in different price quantiles).

While popular price ranges are shown in this example (and subsequent examples) to be displayed in a pop-up window 820, other embodiments may display one or more popular price ranges anywhere else on or over the web page 802 (e.g., above the "Categories" column).

Figure 9:
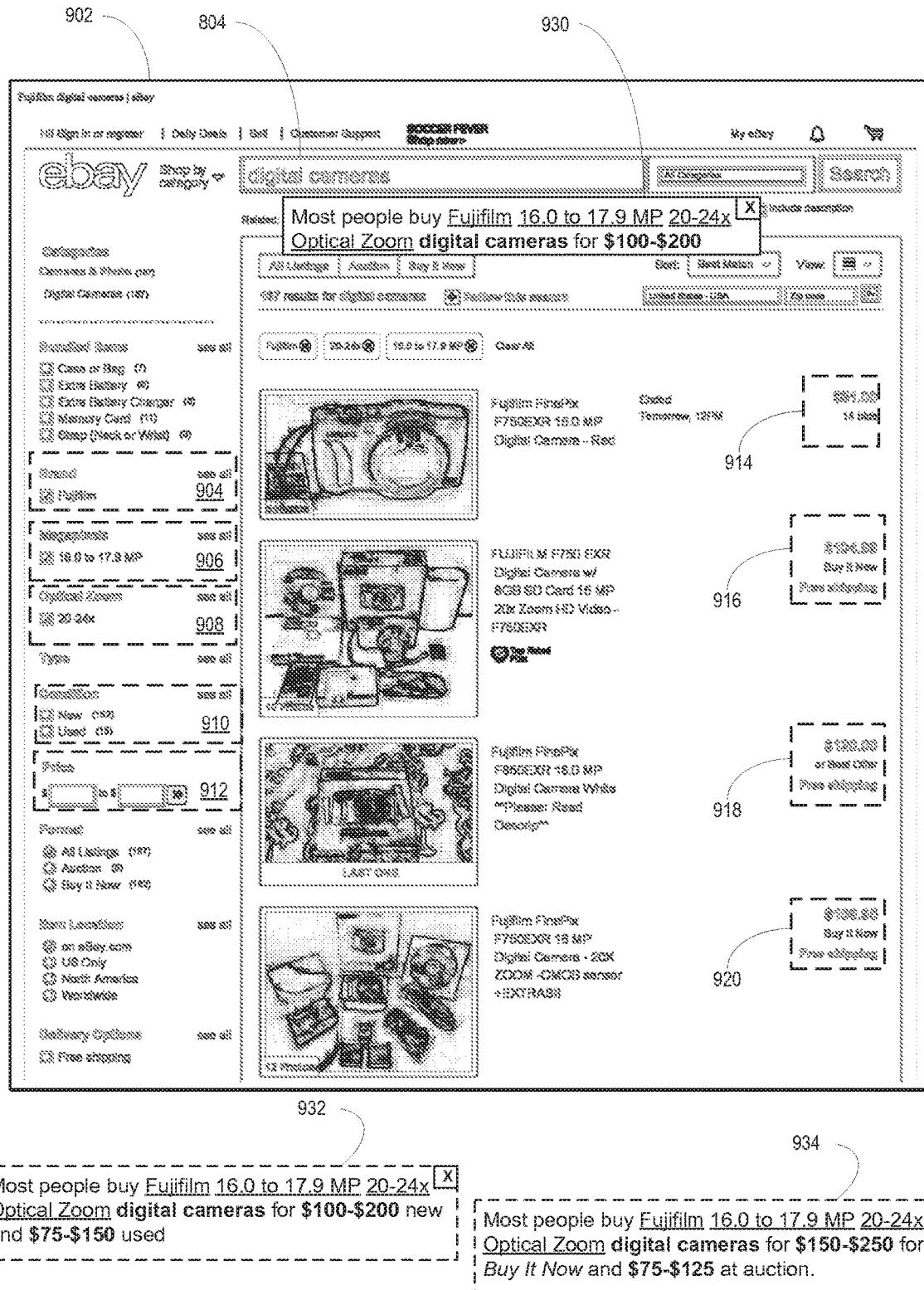
FIG. 9 illustrates yet another web page of the electronic marketplace displaying filters and corresponding filter values for narrowing the scope of displayed search results, according to aspects of the disclosure.

FIG. 9 illustrates yet another web page 902 of the electronic marketplace displaying filters 904-912 and corresponding filter values for narrowing the scope of displayed search results according to aspects of the disclosure. Each of the filters 904-912 may be selectable by the user in order to narrow the search results of the search query 804. The filters 904-912 may include a manufacturing characteristic filter 904 (e.g., a brand), one or more physical characteristics filters 906-910 (e.g., megapixels, optical zoom ability, condition), and a pricing characteristic 912. The pricing characteristic 912 may be configurable by the user to display search results matching a price and/or price range entered by the user.

In this example, in response to receiving the filter values selected by the user (e.g., filters 904, 906, and 908), a pop-up window 930 is displayed including a popular price range for the narrowed results of the search query 804. In this example, the information identifying the selected filters is included in the pop-up window 930. Furthermore, in this example, price 914 does not fall within the popular price range, while prices 916-920 do.

Other embodiments may further present a plurality of narrowed popular price ranges. For example, instead of the pop-up window 930, another pop-up window 932 may alternatively be displayed which includes popular price ranges for "new" and "used" items (e.g., the filter 910 is not selected by the user). In another example, another pop-up window 934 may alternatively be displayed which includes popular price ranges for fixed price and auction based items.

Figure 10:
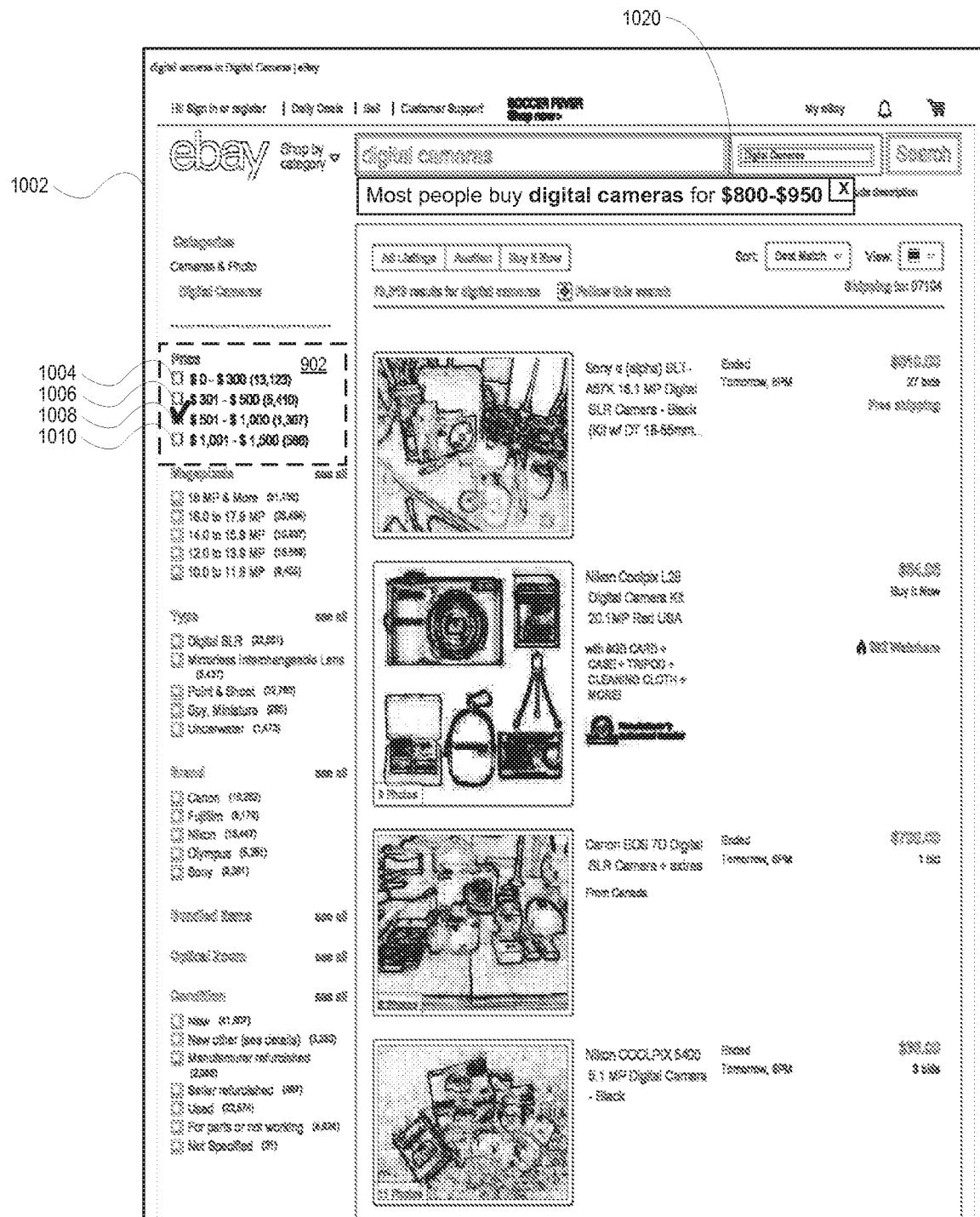
FIG. 10 illustrates yet another web page of the electronic marketplace displaying price ranges that have been determined for the received search query, according to aspects of the disclosure.

In some embodiments, after the price points have been associated with a corresponding search query, and the price quantiles have been determined, the display engine 522 of FIG. 5B causes the display of a web page or other electronic document having one or more price ranges corresponding to the determined price quantiles and associated with the received search query. FIG. 10 illustrates a web page 1002 of the electronic marketplace displaying price ranges 1004-1010 that have been determined for a received search query, according to aspects of the disclosure. As shown in FIG. 10, the price ranges 1004-1010 may include a first price range 1004, a second price range 1006, a third price range 1008, and a fourth price range 1010. Moreover, each of the price ranges 1004-1010 is selectable by the user, which results in a display of search results having prices corresponding to a selected price range. Furthermore, each of the price ranges 1004-1010 may have a corresponding item count, which is displayed alongside the respective price range and indicative of the number of items having a price within the respective range. In this manner, not only do the selectable price ranges 1004-1010 provide a relatively comprehensive view of the prices of items matching a given search query, they also provide a relatively easy and rapid mechanism for a user to narrow in on a specific range that he or she may have in mind. In this example, the third price range 1008 is selected and a pop-up window 1020 is displayed, and includes a popular price range within the (selected) third price range 1008.

Figure 11A:
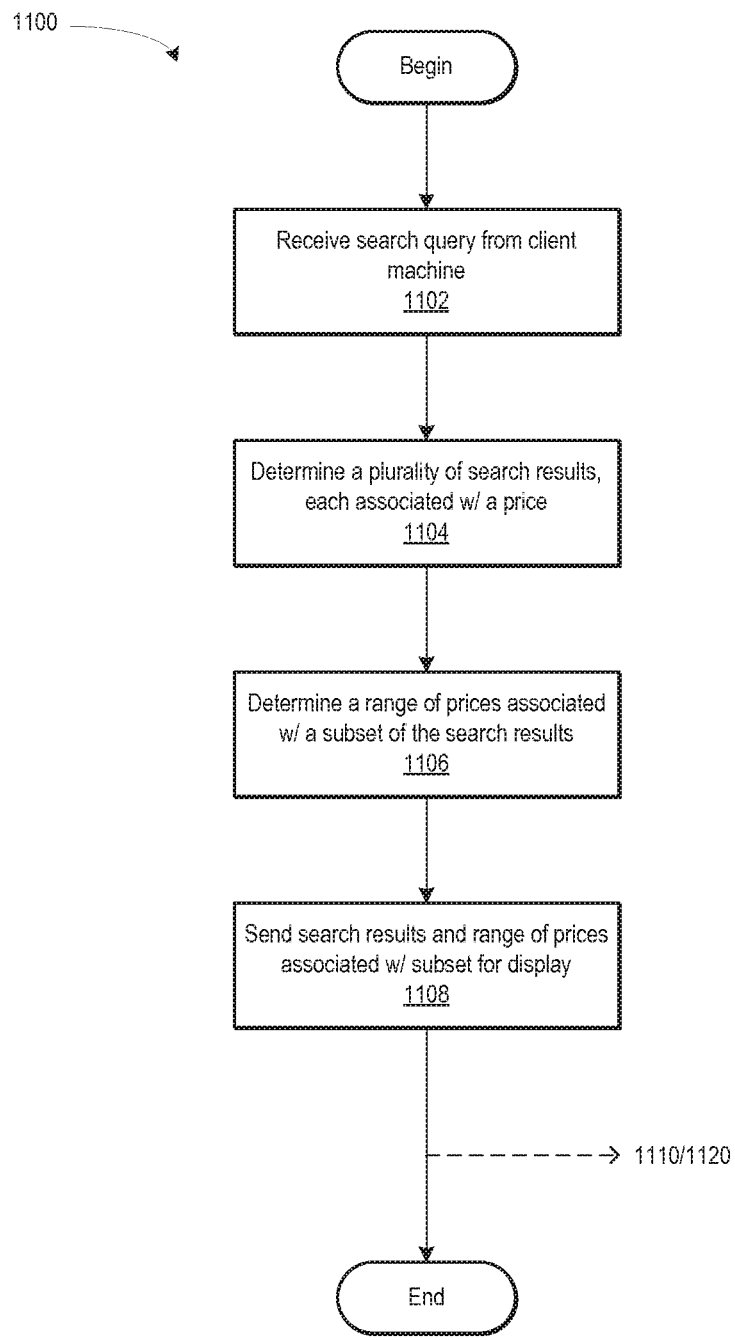
FIGS. 11A-11C illustrate exemplary logic flows for dynamically determining popular price ranges for one or more items based on one or more received search queries according to aspects of the disclosure.
Figure 11B:
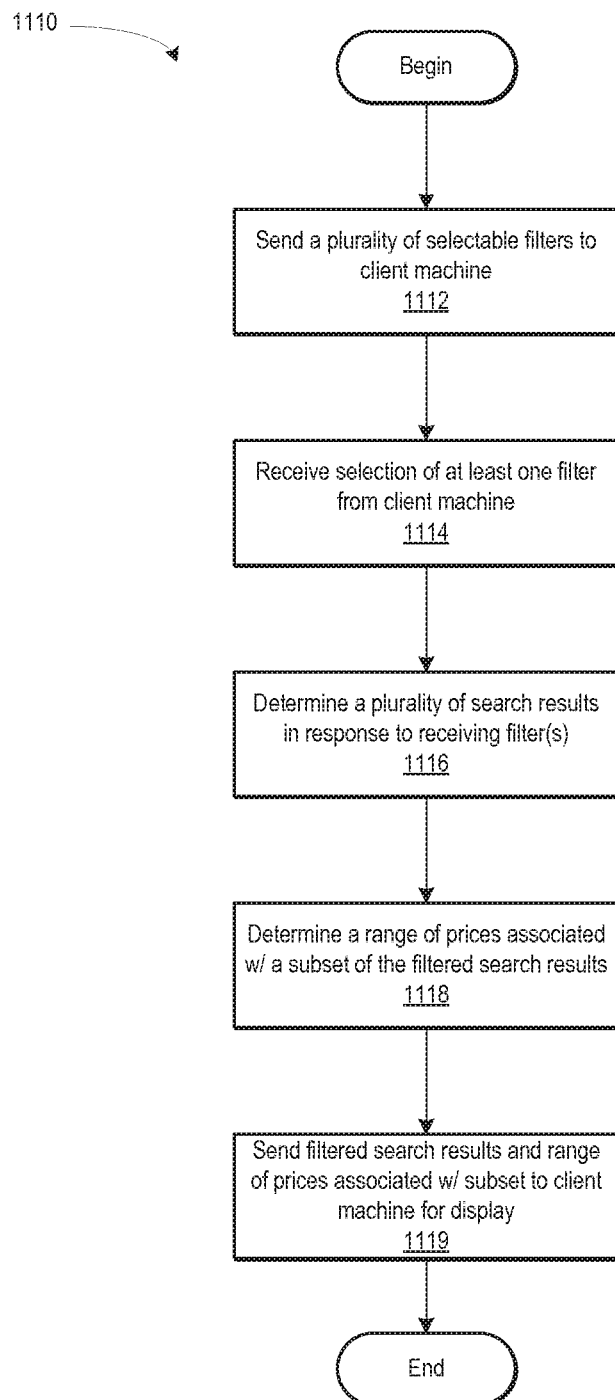
Figure 11C:
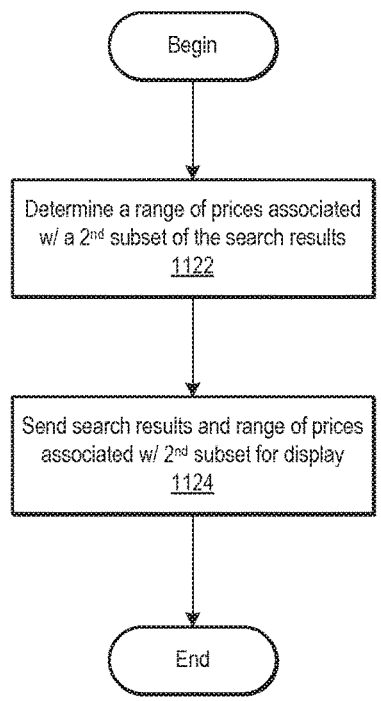

FIGS. 11A-11C illustrate exemplary logic flows for dynamically determining popular price ranges for one or more items based on one or more received search queries according to aspects of the disclosure. Any one of the logic flows shown in FIGS. 11A-11C may be used in combination with, or instead of, any other logic flow shown in FIGS. 11A-11C. Thus, in some embodiments, the disclosed systems may perform one or more methods that include FIGS. 11A-11C.

FIG. 11A illustrates a logic flow 1100 that includes executing an operation to receive a search query, from a client machine, for an item offered for sale through a publication system (e.g., an electronic marketplace) (block 1102). An operation to determine a plurality of search results is executed (block 1104), wherein each result is associated with a price. An operation to determine a popular range of prices associated with a subset of the search results is executed (block 1106). In some embodiments, the popular price range corresponds to any plurality of items that includes the item associated with the median price value for the plurality of search results. For example, the popular range may correspond to a majority of the search results, or may be centered on a mean price value of the plurality of search results. In other embodiments, this subset is determined based on a utility cost function using a plurality of price quantiles and a plurality of price values included in different price quantiles. Furthermore, the subset of search results may be determined based on any number of factors, including selectable search filters (such as those illustrated in FIG. 11B and described below), user history, etc.

An operation to send the search results, and the determined price range, to the client machine for display is executed (block 1108). In some embodiments, any combination of process logic flow 1110 and logic flow 1120 is also executed.

FIG. 11B illustrates logic flow 1110 that includes executing an operation to send a plurality of selectable filter values to the client machine for display (block 1112). In this embodiment, each filter value, alone or in combination, is used to narrow the scope of the plurality of search results from block 1104 of FIG. 11A. An operation is executed to receive a selection of at least one filter value from the client machine (block 1114).

In some embodiments, the selectable filter values include a plurality of price quantiles each comprising at least one price associated with an item from the search results. In some of these embodiments, the plurality of price quantiles includes the range of prices associated with the plurality of search results from block 1104 of FIG. 11A. In some embodiments, the selectable filter values include values to filter auction-based price values or fixed price values from the first plurality of search results.

An operation is executed to determine another plurality of search results from the plurality of offered items (block 1116). This operation is executed based, at least in part, on the received search query from block 1102 of FIG. 11A and the received selected filter value(s) from block 1114.

An operation is executed to determine a range of popular prices associated with a subset of the narrowed search results (block 1118). In some embodiments, this subset of search results includes a median price for the narrowed search results. In other embodiments, this subset is determined based on a utility cost function using a plurality of price quantiles and plurality of price values included in different price quantiles. An operation is executed to send the filtered search results and the popular range of prices to the client machine (block 1119).

In some embodiments, processes may determine popular ranges for a plurality of related subsets of the search results of block 1104 of FIG. 11A. FIG. 11C illustrates logic flow 1120 that includes executing an operation to determine a range of prices associated with a second subset of the plurality of search results (block 1122). For example, in one embodiment, the subset discussed in block 1106 of FIG. 11A may comprise new items, and said second subset may comprise used items. In another example, the subset discussed in block 1106 of FIG. 11A may comprise fixed price items, and said second subset may comprise auction based items. The range of prices associated with the second subset of the search results is sent to the client machine for display (block 1124).

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Descriptions of a plurality of features including the term "or" are to be interpreted as including any possible combination of said features.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, (e.g., a computer program tangibly embodied in an information carrier, in a machine-readable medium for execution by, or to control the operation of, data processing apparatus, a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments. It is contemplated that any features of any embodiments disclosed herein can be combined with any other features of any other embodiments disclosed herein. Accordingly, these any such hybrid embodiments are within the scope of the present disclosure.

What is claimed is:

1. An apparatus comprising:
one or more hardware processors and memory configured to provide computer program instructions to the one or more hardware processors;
a client device configured to use the one or more hardware processors to:
communicate, to a search engine of a marketplace system, a first search query indicating an item listed by the marketplace system, wherein the first search query is configured to:
(i) cause the marketplace system to determine a first plurality of listings from a plurality of listings based, at least in part, on the first search query; and
(ii) cause a dynamic price range determination system in communication with the marketplace system to: (a) determine, by a listings search engine of the dynamic price range determination system, a second plurality of listings representative of popular prices, the second plurality of listings determined from the plurality of listings based, at least in part, on the first search query and one or more first selection criteria, wherein the second plurality of listings includes at least one different listing than the first plurality of listings, wherein each of the second plurality of listings is associated with a price; and (b) determine, by a price point computation engine of the dynamic price range determination system, a range of representative prices based on the second plurality of listings and one or more second selection criteria;

receive, from the search engine of the marketplace system, the first plurality of listings;

receive, from the dynamic price range determination system, the range of representative prices; and cause a graphical user interface (GUI) of the client device to present the first plurality of listings and the range of representative prices.

2. The apparatus of claim 1, wherein the client device is configured to utilize the one or more hardware processors to further:

cause the GUI to present data for a plurality of selectable filter values, wherein each filter value of the plurality of selectable filter values, alone or in combination, is selectable to narrow a scope of the first plurality of listings into a narrowed first plurality of listings;

receive a selection of at least one filter value;

communicate the selected at least one filter value to the listings search engine;

receive the narrowed first plurality of listings and a second range of prices determined based on a narrowed second plurality of listings, the narrowed second plurality of listings determined by the listings search engine from the plurality of listings based, at least in part, on the first search query, the selected at least one filter value and the one or more first selection criteria, the second range of prices determined by the price point computation engine based on the narrowed second plurality of listings and the one or more second selection criteria; and cause the GUI to present data for the narrowed first plurality of listings and the second range of prices.

3. The apparatus of claim 2, wherein the plurality of selectable filter values includes a plurality of price quantiles.

4. The apparatus of claim 3, wherein the plurality of price quantiles corresponds to the range of representative prices determined based on the second plurality of listings.

5. The apparatus of claim 2, wherein the plurality of selectable filter values includes values to filter auction-based price values or fixed price values from the first plurality of listings.

6. The apparatus of claim 1, wherein items of a first subset of the first plurality of listings comprise unused items, wherein the client device is configured to utilize the one or more hardware processors to further:

receive a second range of prices determined by the price point computation engine and associated with a second subset of the first plurality of listings, wherein items of the second subset of the first plurality of listings comprise used items; and cause the GUI to present data for the second range of prices.

7. The apparatus of claim 1, wherein items of a first subset of the first plurality of listings comprise fixed price items, wherein the client device is configured to utilize the one or more hardware processors to further:

receive a second range of prices determined by the price point computation engine and associated with a second subset of the first plurality of listings, wherein items of the second subset of the first plurality of listings comprise auction based items, wherein the second range of prices associated with the auction based items comprise final bid prices, wherein the second subset of the first plurality of listings includes a median final bid price for used items of the first plurality of listings; and cause the GUI to present data for the second range of prices.

8. The apparatus of claim 1, wherein the one or more first selection criteria define a collection of clicked listings as a source for the second plurality of listings representative of popular prices.

9. The apparatus of claim 1, wherein the determined range of representative prices is centered on a mean price value for the first plurality of listings.

10. The apparatus of claim 1, wherein the one or more first selection criteria define a collection of listings as a source for the second plurality of listings representative of popular prices, and wherein the one or more second selection criteria comprise a determination of the range of representative prices using prices from the collection of listings associated with purchases made during a same session as a corresponding search query.

11. The apparatus of claim 1, wherein the dynamic price range determination system is configured to monitor clicked listings and generate a corresponding collection of clicked listings; and wherein the one or more first selection criteria define the collection of clicked listings as a source for the second plurality of listings representative of popular prices.

12. The apparatus of claim 1, wherein the client device comprises at least one of a web client or a programmatic client.

13. A method comprising:

communicating, from a client device to a search engine of a marketplace system, a data transmission including data indicating a first search query for an item listed by a publication system, wherein the first search query is configured to:

(i) cause the marketplace system to determine a first plurality of listings from a plurality of listings based, at least in part, on the first search query; and;

(ii) cause a dynamic price range determination system in communication with the marketplace system to: (a) determine, by a listings search engine of the dynamic price range determination system, a second plurality of listings representative of popular prices, the second plurality of listings determined from the plurality of listings based, at least in part, on the first search query and one or more first selection criteria, wherein the second plurality of listings includes at least one different listing than the first plurality of listings, wherein each of the second plurality of listings is associated with a price; and (b) determine, by a price point computation engine of the dynamic price range determination system, a range of representative prices based on the second plurality of listings and one or more second selection criteria;

receiving, from the search engine of the marketplace system, the first plurality of listings;

receiving, from the dynamic price range determination system, the range of representative prices; and causing a graphical user interface (GUI) of the client device to present the first plurality of listings and the range of representative prices.

14. The method of claim 13, further comprising:
causing the GUI to present a plurality of selectable filter values, wherein each filter value, alone or in combination, is selectable to narrow a scope of the first plurality of listings into a narrowed first plurality of listings;
receiving a selection of at least one filter value;
communicating a second data transmission including data indicating the selected at least one filter value;
receiving the narrowed first plurality of listings and a second range of prices determined based on a narrowed second plurality of listings, the narrowed second plurality of listings determined by the listings search engine from the plurality of listings based, at least in part, on the first search query, the selected at least one filter value and the one or more first selection criteria, the second range of prices determined by the price point computation engine based on the narrowed second plurality of listings and the one or more second selection criteria; and
causing the GUI to present the narrowed first plurality of listings and the second range of prices determined based on the narrowed second plurality of listings.

15. The method of claim 14, wherein the plurality of selectable filter values includes a plurality of price quantiles.

16. The method of claim 15, wherein the plurality of price quantiles corresponds to the range of representative prices determined based on the second plurality of listings.

17. The method of claim 14, wherein the plurality of selectable filter values includes values to filter auction-based price values or fixed price values from the first plurality of listings.

18. The method of claim 13, wherein items of a first subset of the first plurality of listings comprise unused items, and wherein the method further comprises:
receiving a second range of prices determined by the price point computation engine and associated with a second subset of the first plurality of listings, wherein items of the second subset of the first plurality of listings comprise used items; and
causing the GUI to present the second range of prices.

19. A non-transitory machine-useable storage medium embodying instructions which, when executed by a machine, cause the machine to perform operations comprising:
communicating, from a client device to a search engine of a marketplace system, a data transmission including data indicating a first search query for an item listed by a publication system, wherein the first search query is configured to:
(i) cause the marketplace system to determine a first plurality of listings from a plurality of listings based, at least in part, on the first search query; and;
(ii) cause a dynamic price range determination system in communication with the marketplace system to:
(a) determine, by a listings search engine of the dynamic price range determination system, a second plurality of listings representative of popular prices, the second plurality of listings determined from the plurality of listings based, at least in part, on the first search query and one or more first selection criteria, wherein the second plurality of listings includes at least one different listing than the first plurality of listings, wherein each of the second plurality of listings is associated with a price; and (b) determine, by a price point computation engine of the dynamic price range determination system, a range of representative prices based on the second plurality of listings and one or more second selection criteria;
receiving, from the search engine of the marketplace system, the first plurality of listings;
receiving, from the dynamic price range determination system, the range of representative prices; and
causing a graphical user interface (GUI) of the client device to present the first plurality of listings and the range of representative prices.

20. The non-transitory machine-useable storage medium of claim 19, wherein the one or more first selection criteria define a collection of clicked listings as a source for the second plurality of listings representative of popular prices.

* * * * *